(12) United States Patent
Saebi

(10) Patent No.: US 8,011,159 B1
(45) Date of Patent: Sep. 6, 2011

(54) METHOD OF PROVIDING A FLOATING HOUSE

(76) Inventor: Nasser Saebi, Glendale, AZ (US)

( * ) Notice: Subject to any disclaimer, the term of this patent is extended or adjusted under 35 U.S.C. 154(b) by 345 days.

(21) Appl. No.: 12/231,157

(22) Filed: Aug. 30, 2008

Related U.S. Application Data

(60) Provisional application No. 60/967,049, filed on Aug. 31, 2007.

(51) Int. Cl.
*E02D 27/00* (2006.01)
*E04H 9/00* (2006.01)

(52) U.S. Cl. .................. 52/745.02; 114/264; 405/219

(58) Field of Classification Search ............... 52/745.02, 52/745.2, 169.9, 1; 114/263–266; 405/218–221
See application file for complete search history.

(56) References Cited

U.S. PATENT DOCUMENTS

| | | | | |
|---|---|---|---|---|
| 2,715,756 | A * | 8/1955 | Carver | 405/229 |
| 4,028,899 | A * | 6/1977 | Carmichael, III | 405/219 |
| 5,347,949 | A * | 9/1994 | Winston | 114/264 |
| 5,647,693 | A * | 7/1997 | Carlinsky et al. | 405/229 |
| 5,775,353 | A * | 7/1998 | Johnson | 135/96 |
| 5,915,325 | A * | 6/1999 | Gerber et al. | 114/263 |
| 5,937,781 | A * | 8/1999 | Isella et al. | 114/230.26 |
| 6,073,573 | A * | 6/2000 | Gruber | 114/264 |
| 6,145,463 | A * | 11/2000 | Zeilinger | 114/267 |
| 6,230,644 | B1 * | 5/2001 | Passen et al. | 114/263 |
| 6,347,487 | B1 * | 2/2002 | Davis | 52/1 |
| 6,746,181 | B1 * | 6/2004 | Heintz et al. | 405/219 |
| 7,128,015 | B1 * | 10/2006 | Rogerson | 114/266 |
| 7,216,603 | B2 * | 5/2007 | Towley et al. | 114/344 |
| 7,607,864 | B2 * | 10/2009 | Kenady | 405/229 |
| 7,793,466 | B2 * | 9/2010 | de Cherance | 52/64 |
| 2002/0185049 | A1 * | 12/2002 | Broderick et al. | 114/264 |
| 2006/0029470 | A1 * | 2/2006 | Berlin | 405/4 |
| 2006/0191460 | A1 * | 8/2006 | Zeilinger et al. | 114/264 |
| 2006/0278153 | A1 * | 12/2006 | Towley et al. | 114/264 |
| 2006/0278154 | A1 * | 12/2006 | Towley et al. | 114/264 |
| 2007/0056498 | A1 * | 3/2007 | Poser | 114/264 |

FOREIGN PATENT DOCUMENTS

JP 06093667 A * 4/1994

* cited by examiner

*Primary Examiner* — Brian Glessner
*Assistant Examiner* — Beth Stephan
(74) *Attorney, Agent, or Firm* — Albert W Davis, Jr.

(57) ABSTRACT

The invention provides a composite building that will float if the building site is flooded. The materials of the composite are resistant to mold and mildew.

3 Claims, 5 Drawing Sheets

METHOD OF PROVIDING A FLOATING HOUSE

This application is a non-provisional patent application of provisional patent application Ser. No. 60/967,049, filed Aug. 31, 2007.

The following references are incorporated by reference: U.S. Pat. No. 6,308,490 issued Oct. 30, 2001 and U.S. Pat. No. 6,912,488 issued Jun. 28, 2005 to Nasser Saebi for Method of Constructing Curved Structures as Part of a Habitable Building, U.S. Pat. No. 6,721,684 issued Apr. 13, 2004 and U.S. Pat. No. 6,985,832 issued Jan. 10, 2006 to Nasser Saebi for Method of Manufacturing and Analyzing a Composite Building.

BACKGROUND OF THE INVENTION

The invention provides a house that will float. This is of special interest in areas like New Orleans where flooding is a constant worry. Of course, a floating house could be used as a "house boat" also. Also, it would make a good option for a beach house.

BRIEF SUMMARY OF THE INVENTION

The invention provides a composite building that will float if the building site is flooded. The materials of the composite are resistant to mold and mildew.

The floating house is formed from a composite material which has a core of plastic foam with Fiber Reinforced Coatings (FRCs) on the inner and outer surface of the core. One example for the coating is Glass Fiber Reinforced Concrete (GFRC). An example for the plastic foam is Expanded Poly-Styrene (EPS).

DETAILED DESCRIPTION OF THE INVENTION

Figure 1:
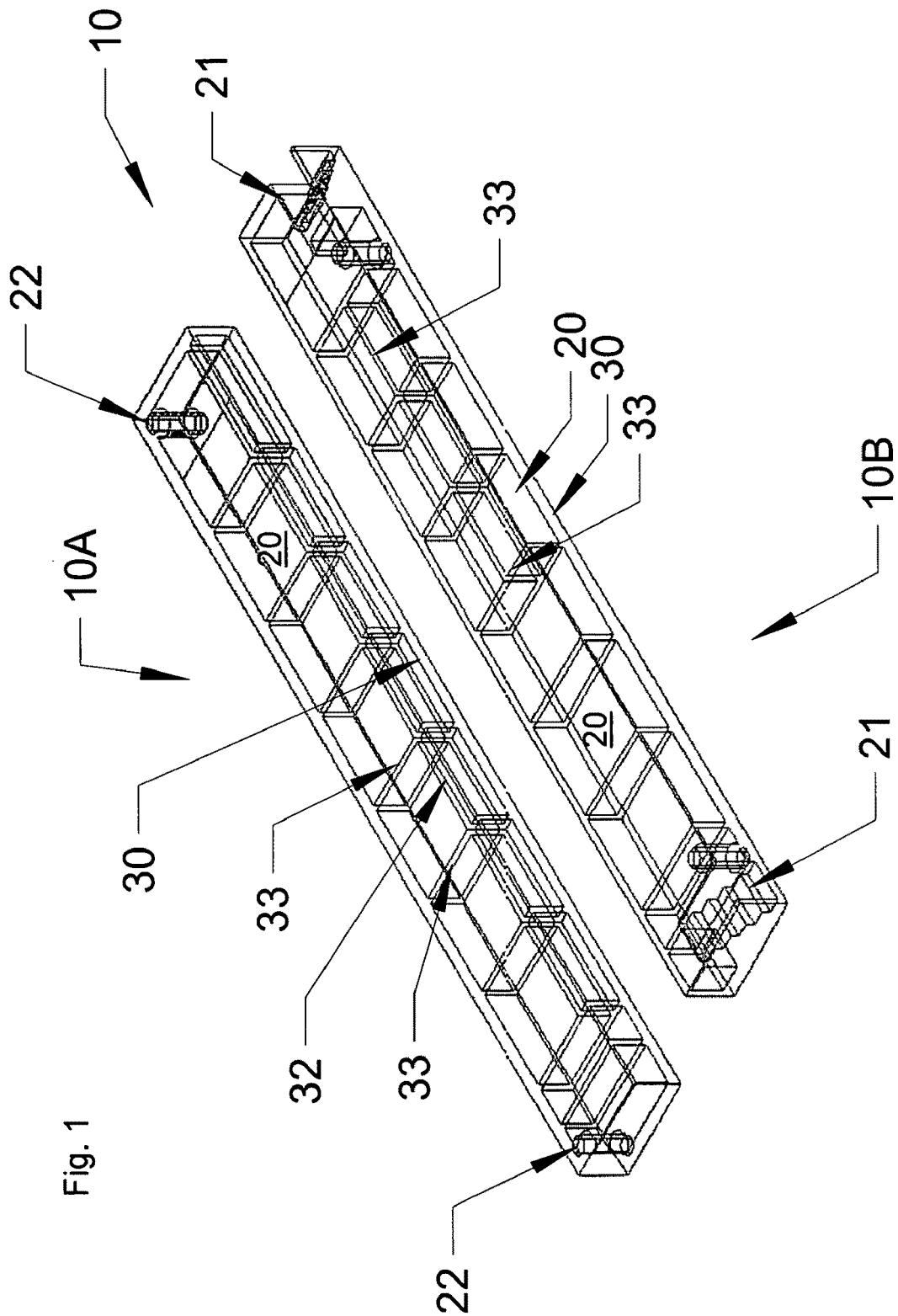
FIG. 1 is an exploded perspective view of a portion of the invention.

FIG. 1 shows a floating base 10 made in two sections 10A and 10B. The base 10 is created from plastic foam pieces that are bonded together to form hollow areas 20, stairs 21 and post holes 22. The inner and outer surfaces of the foam are coated with a Fiber Reinforced Coating (FRC), such as Glass Fiber Reinforced Concrete (GFRC).

The base sections 10A, 10B have lower portions 30 and vertical outer sidewalls 31 and intermediate sidewalls 32. Each base section 10A, B is partitioned off by vertical inner walls 33. Some walls have not been shown such as the near sidewalls 31 on section 10A (nearest end) and 10B (nearest side). Those walls can be added at the building site. The FRC can be left off of the surface areas next to the joint between the later added walls and the base section that has been coated before transport and handling. The FRC is then added at the site to join the walls.

Figure 2:
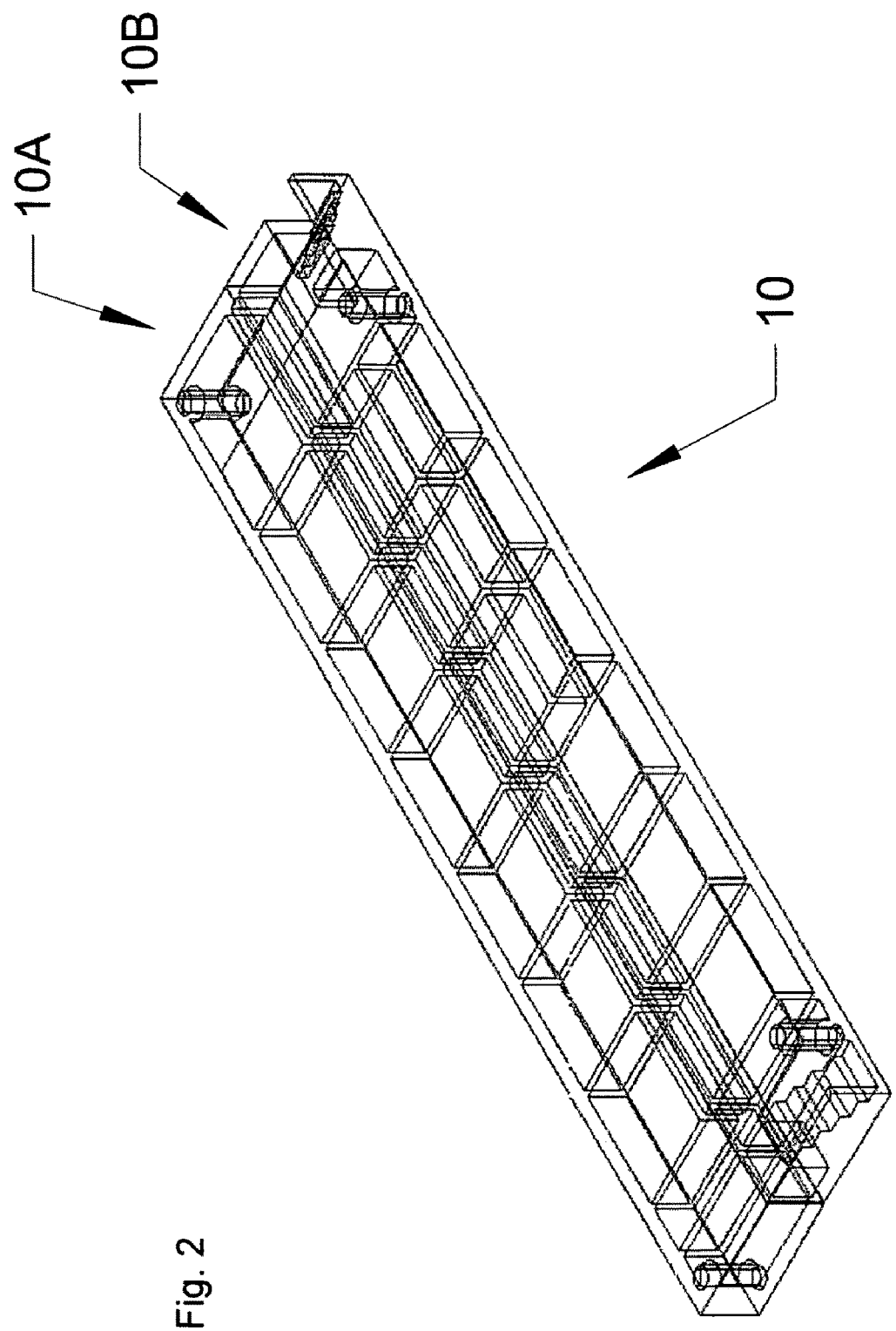
FIG. 2 is a perspective view of the united portion of the invention of FIG. 1.

FIG. 2 shows the two base sections 10A and 10B joined together to form the base 10. The sections are joined by a suitable bonding agent. The surfaces of the base sections can be coated with FRC to add strength for transporting and handling the base sections.

Figure 3:
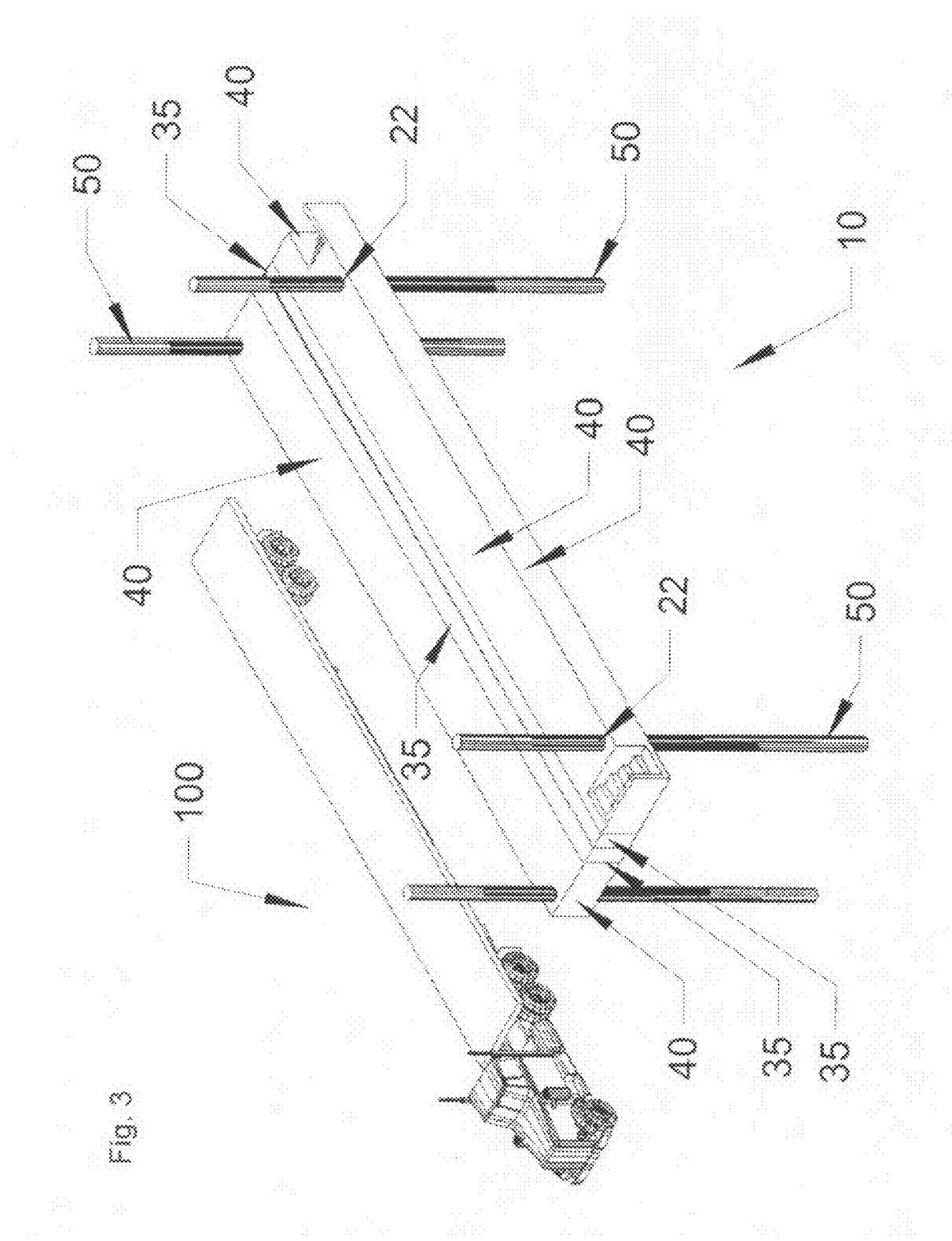
FIG. 3 is a perspective view of more of the invention.

FIG. 3 shows the truck 100 that transported the base sections 10A, 10B to the building site. FIG. 3 also shows the base 10 with a coating of a FRC (GFRC) 40 covering all of the exterior surfaces. The outer surface areas 35 of the sections next to where the sections are joined are preferably left uncoated with FRC. These uncoated areas on each section are then joined by the FRC during the process of joining the base sections. Posts 50 are slideably positioned within the postholes 22.

Figure 4:
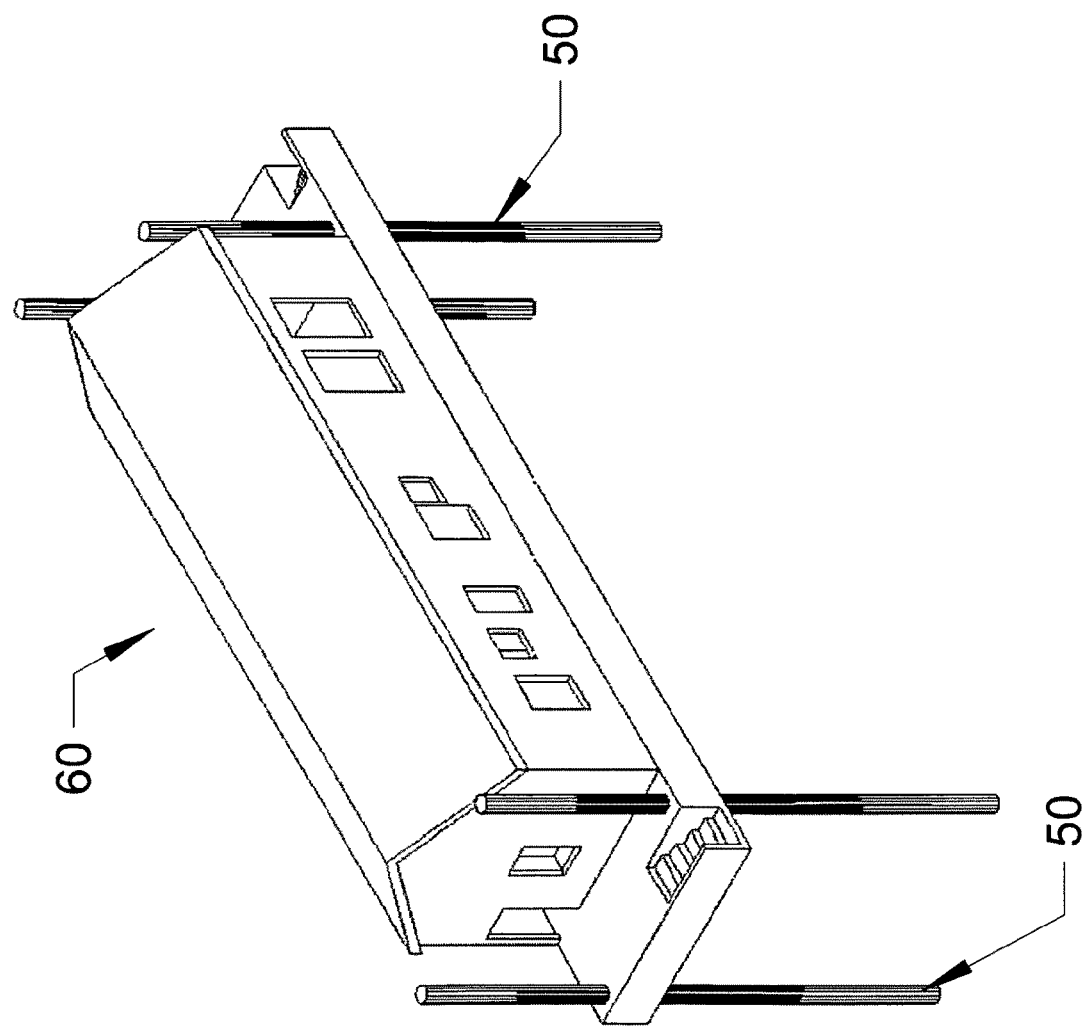
FIG. 4 is a perspective view of more of the invention.

FIG. 4 shows the house 60 attached to the base 10. The house 60 and base 10 will float/slide up and down on the posts 50 if flooding of the building site occurs. The posts 50 are secured in the ground at the site by suitable methods, such as a poured concrete ball around the bottom of the post, etc. The house can be sited on the ground or above the ground. If sited above ground, the base and house is supported by the posts by providing a support on the posts for the base. More posts and/or reinforcement of areas around the posts may be necessary.

Figure 5:
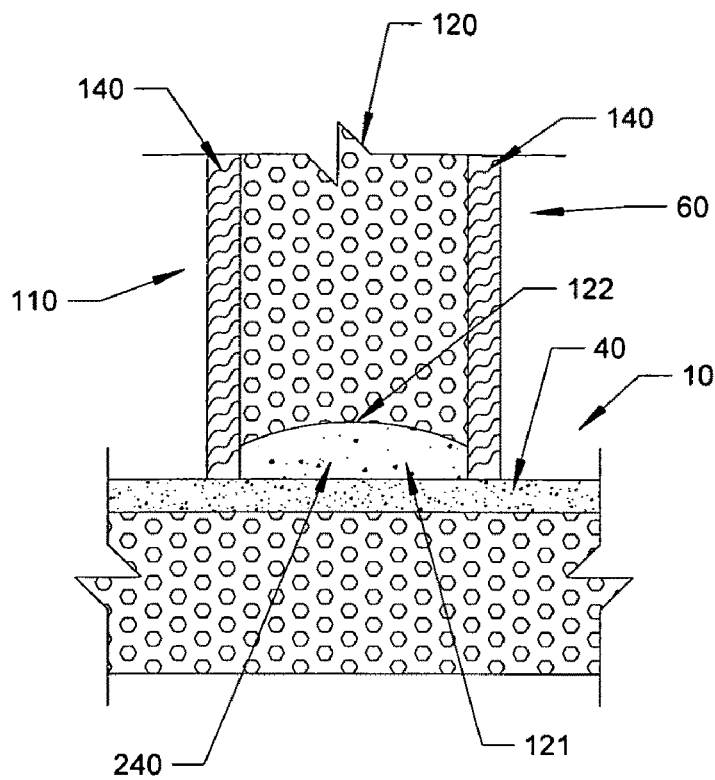
FIG. 5 is a cross-sectional view of a portion of the invention.

FIG. 5 shows the connection between the house 60 and the base 10. The wall 110 of the house 60 can be formed from plastic foam panels 120 with a FRC 140 on each side or surface of the foam panels 120. The bottom edge of the foam panel 120 is removed to create a cavity 121 delineated by line 122. Grout 240, such as GFRC or other FRC, is placed on the FRC surface 40 of the base 10. Then, wall 10 is placed on top enough of the grout 240 so that the grout 240 fills the cavity 121 and bonds to the foam panel 120 to the FRC of the base 10. If the top surface of the base 10 has not been coated with FRC 40, the grout 240 can connect the foam panel 120 to the foam of the base 10.

Figure 6:
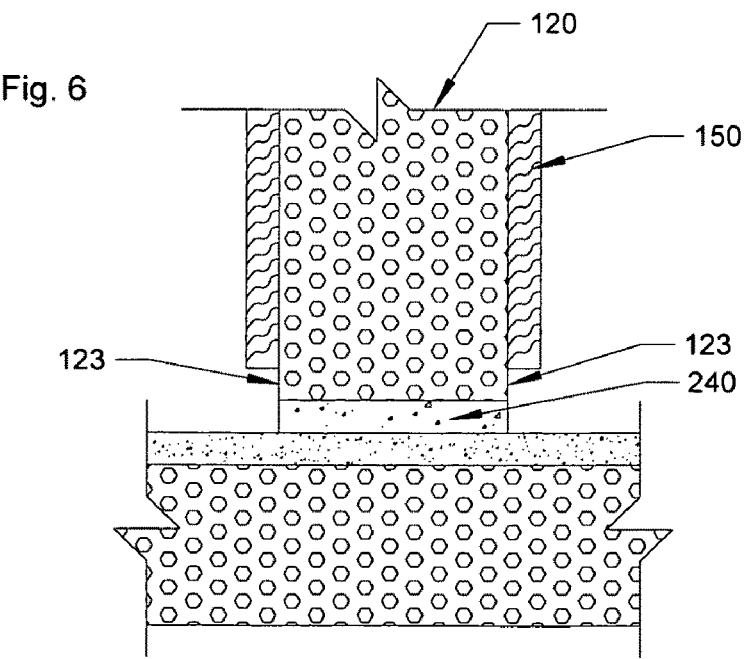
FIG. 6 is a cross-sectional view of a portion of the invention.

FIG. 6 shows another embodiment in the connection between the house 60 and the base 10. In this embodiment, the wall 110 is formed from plastic foam panels 120 with a Oriented Strand Board (OSB) 150 attached to each side or surface of the foam panels 120. These panels are known as Structural Insulated Panels (SIPs). In this embodiment, the OSB 150 does not cover a portion 123 of the bottom of the foam panel 120 since OSB can be damaged by grout that has water as a component. The bare portion 123 of the foam panel can be 0.25 inches or greater. Then, grout 240 is placed on the FRC 40 surface of the base 10 to bond the foam panel 120 to the base FRC.

Various changes and modifications to the embodiments herein chosen for purposes of illustration will readily occur to those skilled in the art.

The FRC can be a Glass Fiber Reinforced Concrete (GFRC) or a Fiber Reinforced Polymer (FRP). The fibers can be plastic, glass, carbon, single-wall carbon nanotubes (SWNTs or Buckytubes), Aramid or other fibers. The Polymer can be Epoxies, Polyesters, Vinlyesters or other materials.

A GFRC formulation is:
1 bag of cement (Portland Cement Type III)—94 pounds,
No. 30 silica sand—100 pounds,
water and ice—25 pounds,
polymer (Forton™ VF-774)—9 pounds,
retarder (Daratard™ 17)—2-5 ounces,
plasticizer (Daracem™19)—2-6 ounces,
0.5 inch glass fibers (Cem-FIL™)—1.5 pounds and
1.5 inch glass fibers—1.5 pounds.

The coating also can be without fibers if the design loading is low enough. For the strongest structure, fibers should be added to the coating. The number of coats of the coating and the composition of those coats can be varied.

The bonding agent between the foam surfaces can be PolyUrethane (PU), GFRC or other material which will adhere to the surfaces to be bonded. GFRC can be used where the joint must have high strength.

The type of plastic foam can be different from Expanded PolyStyrene (EPS). The EPS can have a density of 1.5 pounds per cu. ft. (nominal) which is actually 1.35 pounds per cu. ft. (actual). EPS was used because a Finite Element Analysis was done using EPS and GFRC. Suitable plastic foams could be PU, EPS, etc.

The specific materials used to build the structure may be varied, such as the type of plastic foam, the bonding agents, the coatings, etc.

To the extent that such modifications and variations do not depart from the spirit of the invention, they are intended to be included within the scope thereof which is assessed only by a fair interpretation of the following claims.

I claim:

1. A method of constructing a floating building, comprising the following steps,
   providing a base formed from plastic foam panels coated with a fiber reinforced coating on the major surfaces of the panels, the base being formed with air tight portions,
   constructing the base in at least two sections,
   transporting the sections to a building site,
   joining the sections together using a fiber reinforced bonding agent,
   adding the building to the base and
   anchoring the base to the building site so that the base can rise vertically when floated.

2. The method of claim 1 wherein the coating is glass fiber reinforced concrete.

3. The method of claim 1 wherein the bonding agent is glass fiber reinforced concrete.

* * * * *